No. 829,370. PATENTED AUG. 21, 1906.
J. W. CRAWFORD.
RAKE.
APPLICATION FILED OCT. 7, 1904.
3 SHEETS—SHEET 2.
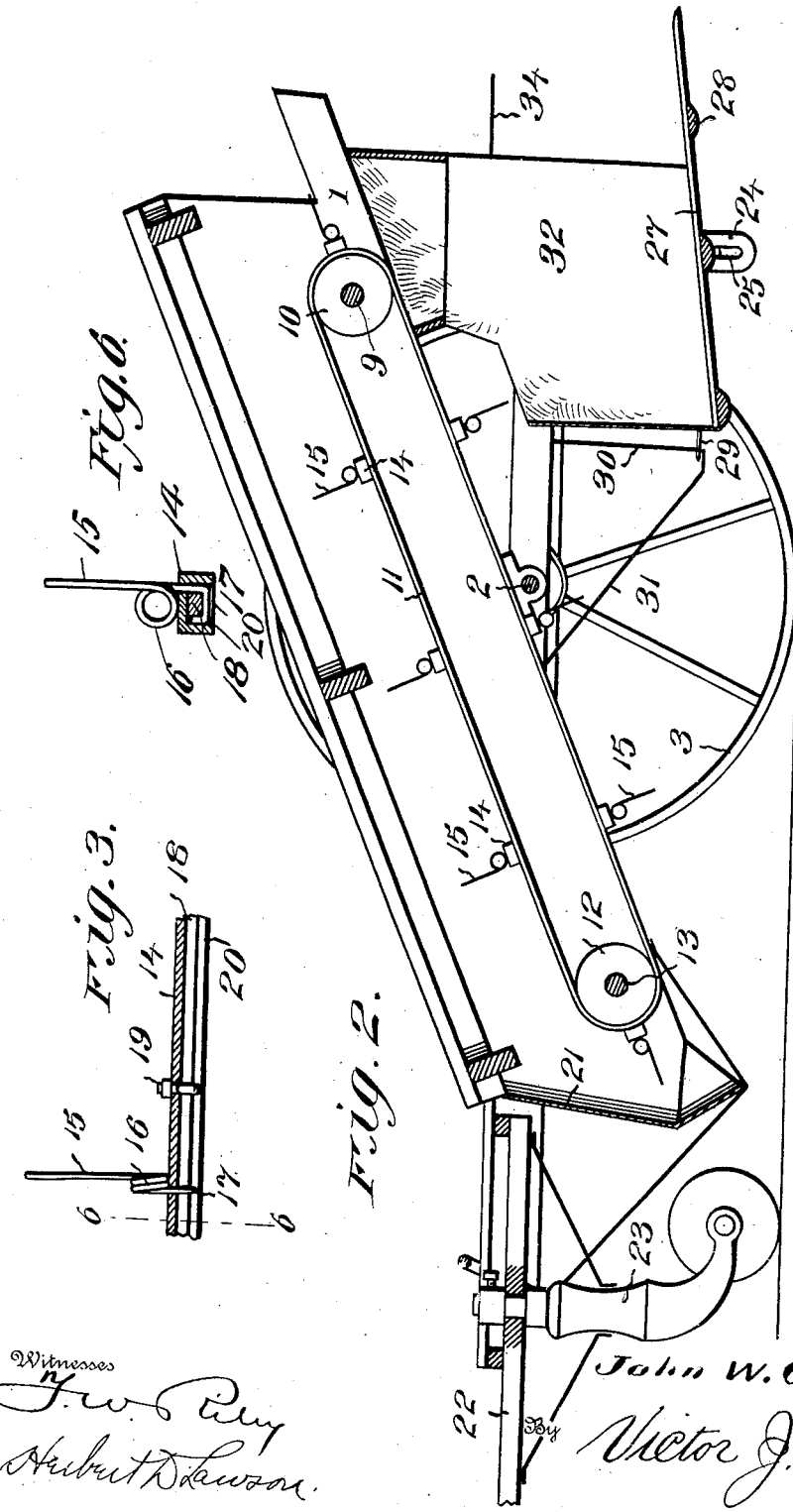

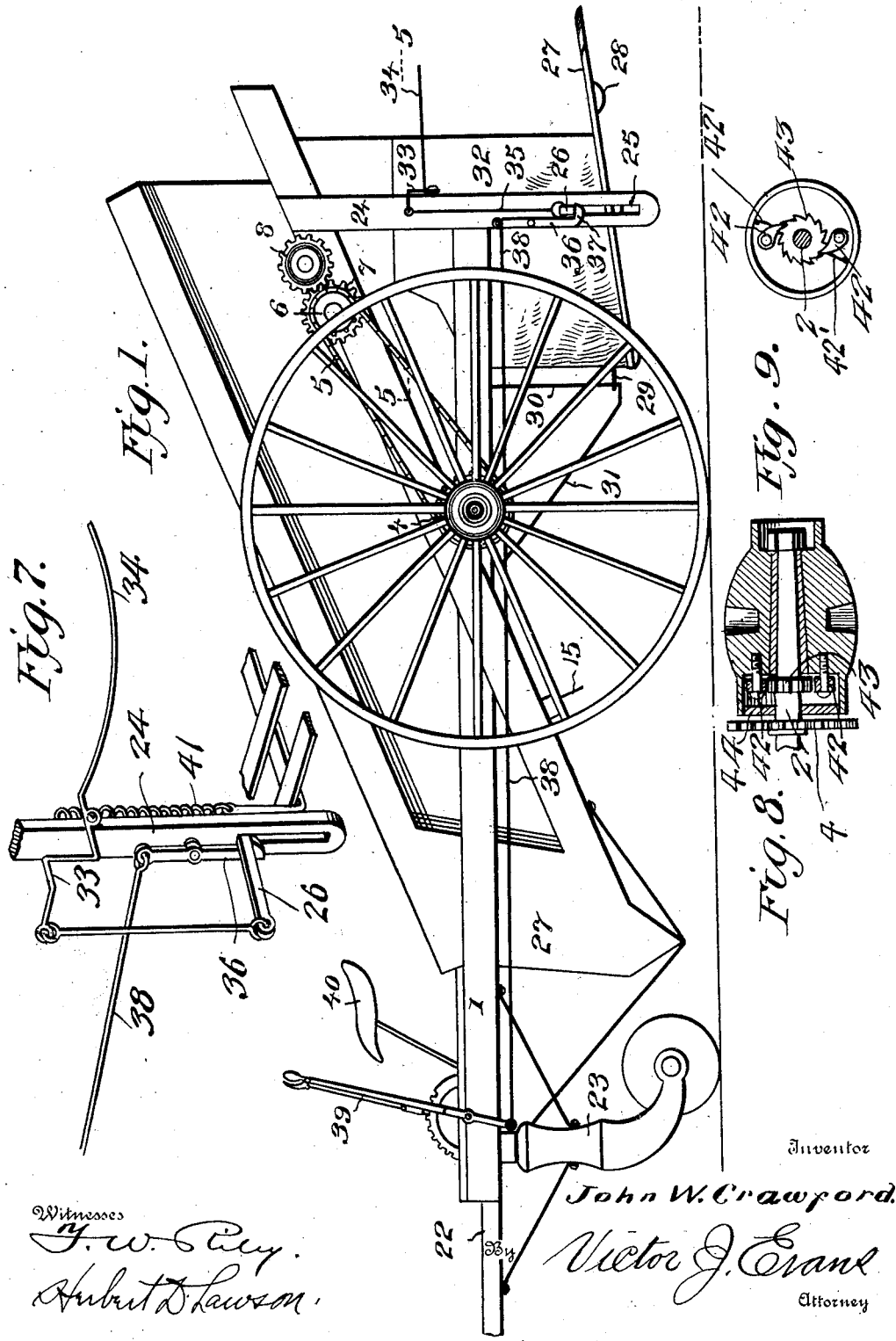

No. 829,370. PATENTED AUG. 21, 1906.
J. W. CRAWFORD.
RAKE.
APPLICATION FILED OCT. 7, 1904.
3 SHEETS—SHEET 3.
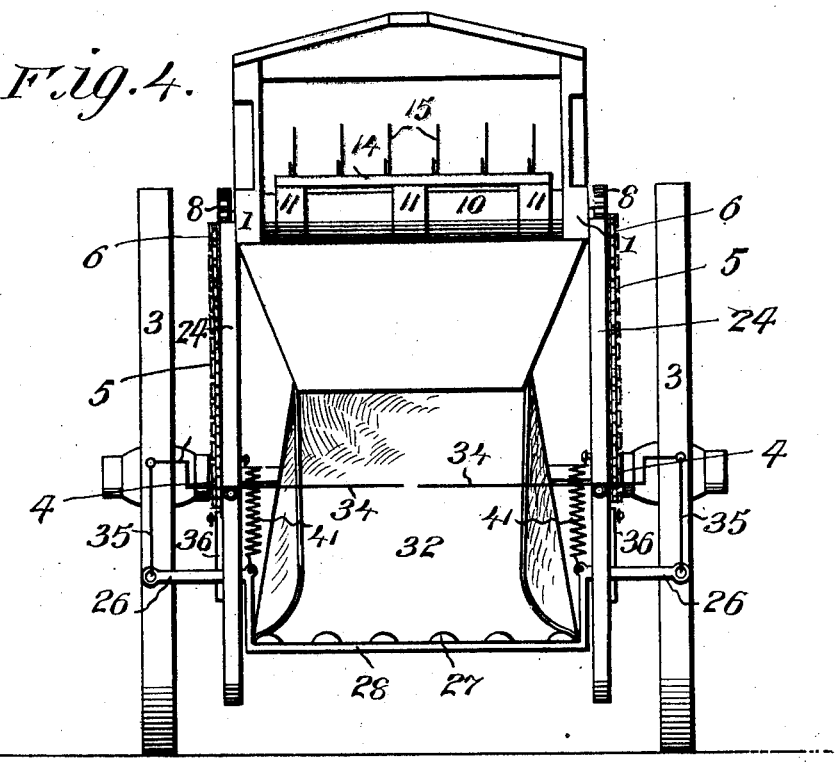
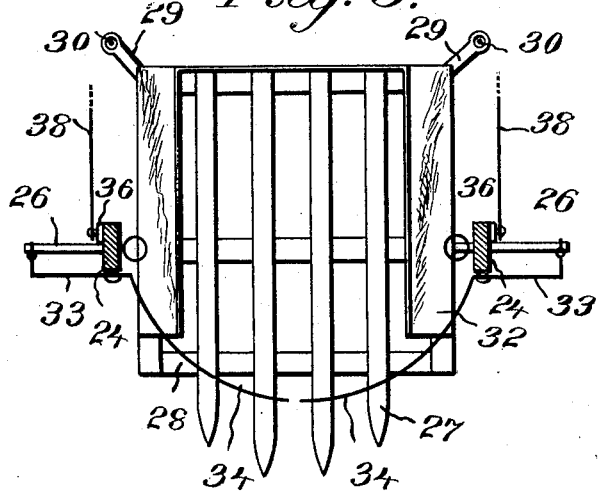
Witnesses
F. W. Riley
Edward T. Welch Jr.
Inventor
John W. Crawford.
By Victor J. Evans
Attorney

UNITED STATES PATENT OFFICE.

JOHN W. CRAWFORD, OF MOUNDSVILLE, WEST VIRGINIA.

RAKE.

No. 829,370.  Specification of Letters Patent.  Patented Aug. 21, 1906.

Application filed October 7, 1904. Serial No. 227,568.

*To all whom it may concern:*

Be it known that I, JOHN W. CRAWFORD, a citizen of the United States, residing at Moundsville, in the county of Marshall and State of West Virginia, have invented new and useful Improvements in Rakes, of which the following is a specification.

My invention relates to new and useful improvements in rakes; and its object is to provide a device of this character having a series of rake-bars adapted to automatically rake the hay and convey it to a receptacle provided therefor and mounted on a platform constituting a portion of the machine.

A further object is to provide means whereby the operator of the machine can automatically dump the contents of the platform.

A further object is to provide means for returning the platform to its normal position subsequent to the dumping operation.

The invention consists in the novel construction and combination of parts hereinafter more fully described and claimed, and illustrated in the accompanying drawings, showing the preferred form of my invention, and in which—

Figure 1 is a side elevation of the rake. Fig. 2 is a longitudinal section therethrough, and Fig. 3 is a longitudinal section through a portion of one of the rake-bars. Fig. 4 is a rear elevation of the machine, and Fig. 5 is an enlarged section on line 5 5, Fig. 1. Fig. 6 is a detail cross-section taken on the line 6 6 of Fig. 3. Fig. 7 is a detail view of the platform-actuating devices. Fig. 8 is a detail view, partly in section, of one of the wheel-hubs, showing the ratchet. Fig. 9 is an end view of the hub, partly broken away to show the ratchet mechanism.

Referring to the figures by numerals of reference, 1 is the frame of the machine, the same being mounted upon an axle 2, having wheels 3 revolubly mounted thereon. A pair of sprockets 4 are secured to the axle, and each of said sprockets has a chain 5 thereon, which is located on a sprocket 6, connected to and revoluble with a gear 7, journaled on the adjacent side of the frame. This gear meshes with a second gear 8, secured to a shaft 9, which projects through the frame at a point near the rear end thereof, and has rollers 10 thereon, upon which is arranged an endless belt 11. This belt extends downward to and around a roller 12, arranged on a shaft 13, which is journaled in the front portion of the frame at a point slightly removed from the ground. Rake-bars 14 are secured to the belt at desired intervals and extend from side to side thereof, and these bars are secured to the belt in any suitable manner. Spring rake-teeth 15 are secured to each bar and have coils 16, which bear upon the bars 14, and the inner ends of these teeth project into the rake-bars and have eyes 17 for the reception of bars 18, which extend through the eyes of all the teeth upon each bar and serve to retain them in position. The bar may be secured in place in any suitable manner, as by means of an eyebolt 19. It will be understood that the bar 18 is fitted within a longitudinally-extending groove 20, which extends longitudinally of the rake-bar 14. The belt 11 is inclosed at the sides and top by a suitable casing 21, and the front end of this casing has a projecting platform 22, which is supported by a caster 23.

Hangers 24 are secured to the sides of the frame 1, at the rear end thereof, and each hanger has a longitudinally-extending slot 25, in which is slidably mounted an L-shaped arm 26, which is secured to one side of a platform 27, formed of any suitable material, preferably slats, arranged upon cross-strips 28. The inner end of the platform has arms or lugs 29 projecting therefrom and provided with eyes or perforations, and these eyes are slidably mounted upon hangers 30, preferably formed of metal rods, suitably strengthened by means of braces 31. Front and side walls 32 are provided for the platform and are preferably composed of canvas or other strong material, the upper edges of which are secured to the frame 1. Angular arms or levers 33 are pivoted to hangers 24 at points above the platform 27, and each of these arms is provided with a bow-shaped portion 34, which projects in rear of the machine and partly across the platform. Each lever 33 is connected to the adjacent arm 26 by means of a rod 35. A lever 36 is pivoted to each hanger and has a head 37, which normally extends under the arm 26 adjacent thereto and serves to support it. The opposite end of this lever is connected by a rod 38 with an operating-lever 39, located at the front of the machine and adjacent a seat 40, provided for the operator. Springs 41 are connected at opposite ends to the arms 26 and the frame 1, respectively, and serve to hold the platform normally supported.

When the machine is drawn forward, the teeth 15 are brought downward to points adjacent the ground. motion being transmitted thereto from one of the wheels 3 to the chain 5 and the gears 6 and 8. It is to be noted that there are two transmitting power-wheels, one on either side of rake, and that these wheels are provided with ratchets, as usual, to enable the rake to be easily handled when in use. Hay will be carried upward by the teeth to the rear end of the casing 21, where it will be deposited upon the platform 27 and between the walls 32 thereon. The arms 34, projecting in rear of the machine, serve to prevent the hay from falling off the platform. When a sufficient amount of material has accumulated upon the platform and it is desired to dump the same, the operator presses forward on lever 39, and thereby causes the locking-levers 36 to swing from under the arms 26. The weight of the hay upon the platform will cause the springs 41 to expand, and arms 26 will therefore slide downward in the slots 25, thereby permitting the hay to slide off the platform, after which the springs will return the parts to their normal positions, and the locking-levers 36 are returned into locking position by reversing the lever 39. It will be understood that the downward movement of the arms 26 will cause the arms or levers 33 to swing downward, thereby swinging the retaining-arms 34 upward from their normal position in rear of the platform, and therefore the hay is free to slide from position between the walls 32. It will be seen that the device is extremely simple in construction, and by means thereof hay can be rapidly raked and deposited at desired points.

To permit ready handling of the machine in use, the hubs of the transporting-wheels 3 are each provided, as seen in Figs. 8 and 9, with a pair of pawls 42, pressed by the springs 42' into engagement with a toothed ratchet 43, fixed on the axle 2 and coöperating with the pawls to operatively engage the wheel with the axle during advance movement of the machine, but to permit rearward rotation of the wheels independently of the axle, whereby the machine may be readily turned, as usual in devices of this character and as will be readily understood. Applied to each hub and over the contained ratchet mechanism is a cap or shield 44 to prevent the entrance of dust to the mechanism.

Having thus described the invention, what is claimed as new is—

1. In a device of the class described, a frame having transporting-wheels, hangers depending from the frame, a platform situated between the hangers, arms extending from the platform and slidably mounted within the hangers, springs operatively engaged with and supporting the platform, pivoted locking-levers normally engaging the arms for supporting the platform, means for disengaging the levers from the arms, and mechanism sustained by the frame for gathering material and delivering it to the platform.

2. The combination with wheels, and a frame supported thereby; of an endless carrier upon the frame, means for transmitting rotary motion thereto from both of the wheels, rake-teeth extending from the carrier, hangers depending from the frame, a platform therebetween, arms extending from the platform and slidably mounted within the hangers, supporting-springs connected to the frame and platform, locking-levers pivoted to the hangers and normally supporting the arms, and means for retracting the levers from the arms.

3. The combination with wheels, and a frame supported thereby; of an endless carrier upon the frame, means for transmitting rotary motion thereto from both of the wheels, rake-teeth extending from the carrier, hangers depending from the frame, a platform therebetween, arms extending from the platform and slidably mounted within the hangers, supporting-springs connected at opposite ends to the frame and platform, locking-levers pivoted to the hangers and normally supporting the arms, means for retracting said levers from the arms, arms pivoted to the hangers, connecting-rods secured to said arms and the arms of the platform, and retaining-arms.

4. The combination with wheels, and a frame supported thereby; of an endless carrier mounted upon the frame, means for transmitting motion thereto from both of the wheels, rake-teeth extending from the carrier, longitudinally-slotted hangers depending from the frame, a platform arranged between the frame, arms extending from the platform and slidably mounted within the hangers, springs connected at opposite ends to said arms and to the frame, locking-levers pivoted to the hangers and normally supporting the arms, means for retracting the locking-levers, retaining-arms pivoted to the hangers, rods connecting said arms with the arms of the platform, hangers depending from the frame and engaged by the platform, and flexible rear and side walls secured to the platform.

In testimony whereof I affix my signature in presence of two witnesses.

JOHN W. CRAWFORD.

Witnesses:
J. E. BLOYD,
W. J. SMITH.